No. 838,418. PATENTED DEC. 11, 1906.
O. JUNGGREN.
VALVE MECHANISM FOR TURBINES.
APPLICATION FILED MAY 21, 1904.
2 SHEETS—SHEET 2.
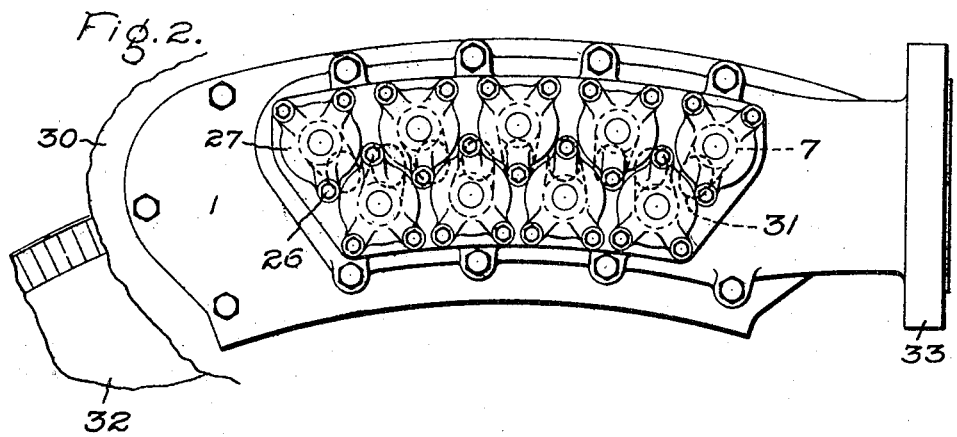
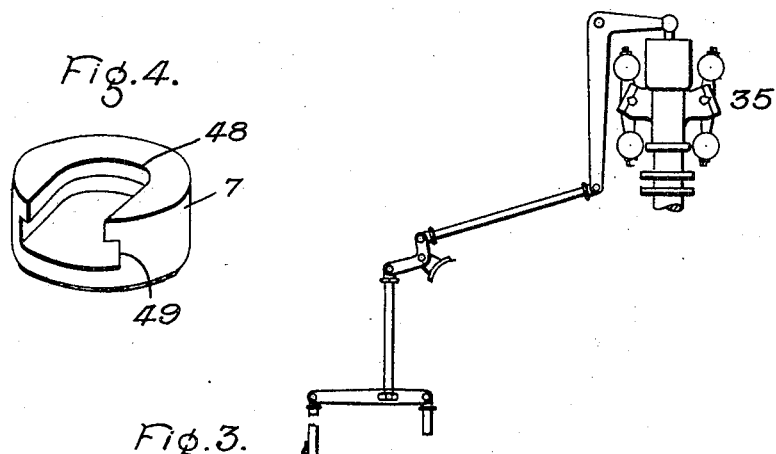
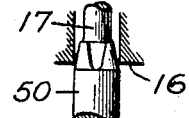
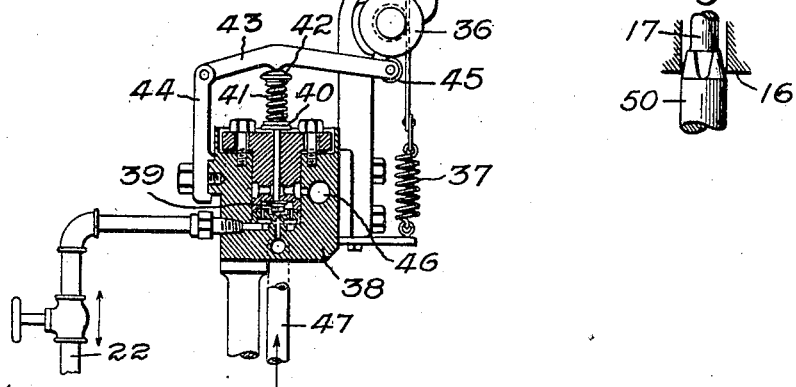
Witnesses:
Marcus L. Byng.
Alex. F. Macdonald.
Inventor:
Oscar Junggren,
by
Atty.

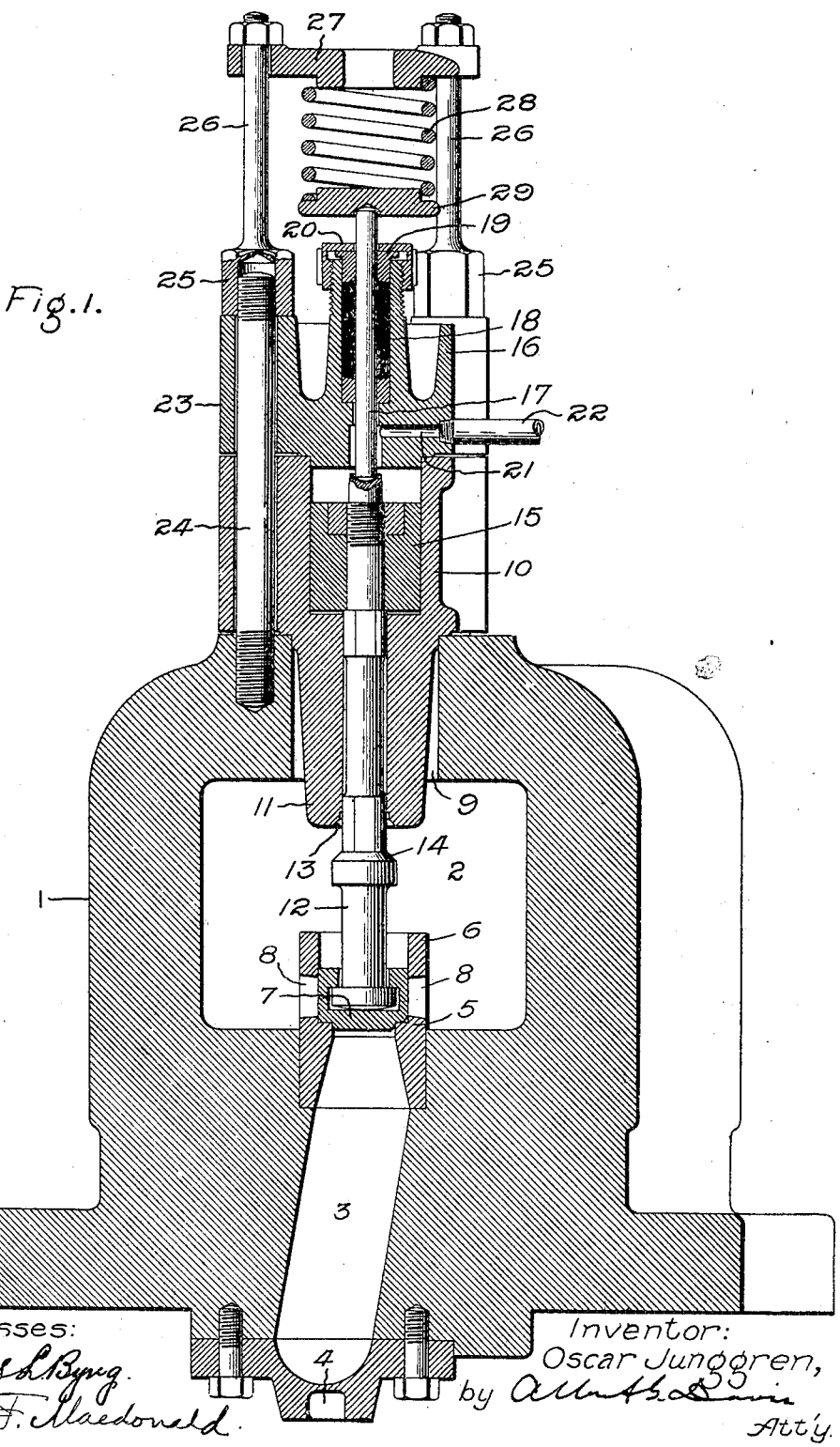

UNITED STATES PATENT OFFICE.

OSCAR JUNGGREN, OF SCHENECTADY, NEW YORK, ASSIGNOR TO GENERAL ELECTRIC COMPANY, A CORPORATION OF NEW YORK.

VALVE MECHANISM FOR TURBINES.

No. 838,418.      Specification of Letters Patent.      Patented Dec. 11, 1906.

Application filed May 21, 1904. Serial No. 209,031.

*To all whom it may concern:*

Be it known that I, OSCAR JUNGGREN, a citizen of the United States, residing at Schenectady, county of Schenectady, State of New York, have invented certain new and useful Improvements in Valve Mechanisms for Elastic-Fluid Turbines, of which the following is a specification.

The present invention relates to valve mechanism for elastic-fluid turbines wherein separately-actuated valves are employed to admit fluid to or cut it off from one or more stages in response to an automatic governor.

The object of the invention is to improve and simplify the construction of the valve mechanism and also to provide means indicating whether the nozzle-valves are open or closed without regard to the position of the governor.

In carrying out the invention a valve chest or casing is provided having a supply-chamber and as many ports leading therefrom to the nozzle-sections or discharge-orifices as are necessary to handle the volume of fluid. Each port is provided with a valve (commonly referred to as a nozzle-valve) which is or may be detachable from its stem, and a seat, removable or otherwise, which, in addition to its functioning as such, acts as a dashpot or checking device to reduce the hammer-blow at the closing of said valve. The seat also acts as a guide for the valve. Each valve, of which there are usually a number, has an open and a closed position, but no intermediate, and is provided with an actuating-piston that is located in a cylinder which is mechanically separate from that of every other valve, although they are all attached to the same chest or support by suitable means. The object of this arrangement is to obviate distortion due to heat and to permit any one valve to be removed or otherwise manipulated without disturbing the other or others. It is desirable to make the periphery of the piston perfectly smooth, since by experiment it has been found that there is less leakage than where the piston is grooved. The valve-stem is preferably enlarged to form a head at one end, so that a valve may be employed which can be readily slipped on and off for renewal or repair. The cylinder is provided with a somewhat-elongated projection that enters the valve-chest and also acts as a guide for the piston-rod or valve-stem. The stem is provided with one or more passages to permit the motive fluid in the chest to have access to one side of the piston for the purpose of opening the valve. In order to cut off the cylinder-space after the valve opens, and thereby prevent leakage, a second or leakage-preventing valve is provided on the valve-stem, which is oppositely disposed with respect to the first and which closes after the inlet or nozzle valve opens a certain distance. It may also act as a positive stop for the nozzle-valve. Situated in line with the cylinder is a head therefor which is chambered out to receive a soft packing that surrounds a stem, the latter extending between the piston and a spring-abutment located outside of the steam-space and where it is readily accessible. The stem may be made separate from the piston, so that dangers due to distortion and lack of alinement are minimized. It is also made separate so that different kinds of metal may be used for the stem and piston parts to prevent erosion. When the stem is made a part of or is rigidly attached to the piston and valve, it can be used to force the valve in one direction or the other. The cylinder-head, in addition to receiving the stem, packing, and its gland, receives a conduit for admitting steam, water, oil, or other fluid to the cylinder. The cylinder and head are secured in place by suitable means, such as stud-bolts that pass through the parts or projections thereon and enter the valve chest or support.

Mounted in line with the head above it when the parts are vertically disposed is an abutment which is normally stationary and is adjustable to change the tension on a spring acting between it and the movable abutment, the latter constantly urging the piston and valve in a direction to close the latter. The stationary abutment may be supported by suitable means, such as pillars or columns, that also act as nuts for the stud-bolts. The movable abutment or the stem, or both, in addition to the functions set forth act as an indicator to show the position of the nozzle-valve. By placing the spring outside of the steam-space and where its action can be observed material advantages are obtained. By this arrangement the spring can be made of a size best suited for the work, and its temper is not affected by the temperature of the working fluid. Again, the position of the spring or coöperating parts, or both, serves as a device to indicate whether the main valve is open or closed, and I regard this as a very important feature. The tension on the spring can also be changed while the apparatus is in operation. None of the advantages above enumerated are found in prior existing governing-valves of the general character referred to. Again, the feature of a valve which closes when the main valve is open and prevents leakage is not found in prior turbine-governing valves. Another and material advantage of my construction resides in the fact that where magnets are employed for controlling the valves they can be located at a suitable distance from the heated parts.

The piston is operated by fluid-pressure, assisted in closing by the spring. When the pressures on opposite sides are balanced, the effect of the spring causes the valve to close. When the pressures are unbalanced, as by exhausting the cylinder on one side of the piston, the pressure on the other side causes the piston to overpower the spring and open the valve. I have mentioned the use of a spring for assisting in closing the valve, but it is to be understood that equivalent devices or arrangements, such as gravity or fluid pressure, elastic or otherwise, may be employed.

The action of the piston is under the control of a relay or secondary valve which either admits motive fluid—such as steam, water, or other fluid—to the cylinder-space or cuts it off. Each of the relay-valves may be actuated by an electromagnet, a cam, or other means, fluid or mechanical. The relay-valves may be actuated by a governor responsive to speed changes or to any other change in the operative condition of the turbine or in the work driven thereby.

The relation between the governor and the several nozzle-valves is such that a valve or valves may stick open or shut without affecting the movement of the governor. This means that the position of the governor is not necessarily a guide as to the number of valves open or closed. Again, the movement of the contact-cylinder or other means attached to the governor is too small to be of service in this connection. By providing each nozzle-valve with an indicator showing whether it is in the open or closed position the operator can, by ascertaining how many valves are open or closed and noting the position of the contact-cylinder, cam, or other valve-actuating means, tell whether or not the system is working properly. In this connection it may be remembered that some of the valves are normally open, some closed, and at least one valve opening and closing with a considerable degree of frequency. The arrangement of valves just described adds to the difficulty of determining whether the valves are working properly. Hence the importance of having a suitable indicator.

The discharge or nozzle passages have to be arranged in the arc of a circle in order to effectively discharge the motive fluid against the wheel-buckets. In order to have a maximum number of nozzle-valves and their motors in a minimum space, the valves and motors are arranged in staggered relation and the passages leading from the valve-seats to the nozzle-passages proper extend from opposite sides toward a common median plane which conforms to the curvature of the wheel. In this way each valve and its motor can be made of substantial proportions, yet the space occupied by them measured in the arc of a circle is very little greater than that of the nozzle-passages themselves. Moreover, the passages between the valve-seats and the nozzles can be made of minimum length. I have shown a motor for each valve; but I may actuate more than one valve with a single motor.

In the accompanying drawings, which represent one embodiment of my invention, Figure 1 is a vertical section taken through the nozzle-valve and valve-chest of an elastic-fluid turbine. Fig. 2 is a plan view of a slightly-modified arrangement of the nozzle-valves and motors for operating them. Fig. 3 shows a governor responsive to speed changes and the relay mechanism for controlling the fluid-motors which actuate the nozzle-valves. Fig. 4 is a perspective view of a detachable nozzle-valve; and Fig. 5 is a detail view showing the piston-rod and rod leading to the movable abutment made of one piece instead of two, as in Fig. 1.

1 represents the valve-chest, which contains a chamber 2 extending from one end to the other. Communicating with the chamber and receiving fluid therefrom is a plurality of chambers or passages 3, which discharge fluid into the bowls of the nozzle-passages 4, the latter being closely associated. The nozzle is made detachable and is secured to the under side of the valve-chest by bolts. The upper end of the passage 3 is slightly enlarged to receive the seat 5, which is also provided with an extension 6, that acts as guide for the nozzle-valve 7. The valve-seat and guide are made from a cylindrical piece of stock, the latter being provided with one or more openings 8, through which the fluid passes from the main chamber 2 to the secondary chamber 3. As many of these valve-seats are provided as there are valves and chambers 3. The upper surface of the chest is finished off true and is provided with as many cylindrical openings as there are valves. Mounted upon the upper side of the chest, when the parts are arranged in a vertical plane, are as many cylinders 10 as there are valves. Each cylinder is provided with a projection 11, which enters the main chamber in the chest and acts as a guide for the valve-stem 12. In addition to acting as a guide the projection is provided with a seat 13, which engages with the leakage-preventing valve 14 when the nozzle-valve is open. The valve-stem 12 above the leakage-preventing valve is provided with flat faces or other arrangements, whereby fluid is permitted to pass from the main chamber to the under side of the piston 15, located in the cylinder when the nozzle-valve is closed. The object of this is to permit the action of the fluid to open the valve when desired.

Each cylinder is provided with a head 16, which is chambered out to receive the stem 17 and the soft packing 18 and adjustable gland therefor. The gland comprises a plunger 19, which engages with the packing, and a nut 20, by means of which the pressure on the packing can be adjusted. It is also provided with a passage 21, that communicates with the cylinder-space above the piston 15 and also with the pipe 22, which may be connected to a high-pressure source of supply or to the exhaust, depending upon whether it is desired to close or open a nozzle-valve. The cylinder and head are each provided with radial projections 23, through which extend stud-bolts 24, that are tapped into the upper side of the valve-chest. The upper ends of these bolts enter nuts 25, which carry the posts or pillars 26, the latter supporting the stationary abutment 27. The abutment is held in place by nuts and is adjustable for the purpose of changing the force exerted by the compression-spring 28. The spring is situated between the stationary abutment and an abutment 29, that engages the upper end of the stem 17, the latter being made of brass or composition. The spring through abutment 29 tends at all times to close the nozzle-valve and by their position indicate whether or not the valve is open or closed.

Referring to Fig. 2, which shows a slight modification in the distribution of the valves and motors for operating them, 1 represents the valve-chest, which is secured to the wheel-casing 30 by bolts. 27 represents the stationary abutments for the several valves, and the arrangement of the pillars or posts 26 for supporting the parts is clearly shown. The heavy black dotted lines 31 show the shape and position of the passages or chambers 3, leading from the main chamber to the sections of the nozzles. It is to be noted that the lower ends of these passages (indicated by the heavy dotted lines) occupy the same curved plane, which plane coincides with that of the bucket-wheel 32. For simplicity of illustration the dotted lines representing the outline of the nozzle structure have been omitted; but the nozzle is of the same general construction as that shown in Fig. 1. It is also to be noted that the valves 7 (shown in dotted lines) are divided into two groups, one of which is located outside of the plane of the passages 31 and the other on the inside, and that the valves and motors of the two groups are staggered with respect to each other. The outer group is provided in the present instance with five valves, while the inner group is provided with four valves, and the projections on the stationary abutments and cylinders are so related that the valves can be nested with respect to each other. The openings in the chest to receive the projecting ends of the cylinders are also staggered. Steam or other elastic fluid is admitted to the main chamber 2 by a conduit which is provided with a flange 33 for attaching it to a pipe from the boiler or other source of fluid-supply.

In Fig. 3, 35 represents a speed-responsive device which is connected, through suitable levers or other equivalent devices, with a cam-cylinder 36. This cylinder is mounted in suitable bearings and is moved in one direction by the levers attached to the speed-responsive device and in the opposite direction by a coiled extension-spring 37. 38 represents a valve-chest which commonly contains as many relay or pilot valves as there are nozzle-valves. Each valve 39 is mounted on the end of a rod, which rod is provided with a head 40, that acts as a seat for the coiled compression-spring 41. The outer end of the spring is provided with a head 42, which engages a projection on the lever 43. The left-hand end of the lever is pivoted to a fixed support 44, while the right-hand end of the lever is provided with an antifriction-roller 45, which engages a projection on the cam-cylinder. Fluid is admitted to the relay-valve chest by a conduit 47 and is exhausted by the conduit 46. Connected to the valve-chest at a point underneath the pilot-valve is a pipe 22, which admits fluid to the upper side of the motor-piston 15, Fig. 1, when it is desired to close the nozzle-valve and connects the cylinder-space above the piston with the exhaust when it is desired to open the valve. In the position shown the pilot-valve is raised, due to the fluid-pressure on the under side, and the supply of high-pressure fluid from the conduit 47 is admitted to the upper side of the piston 15.

Owing to the changes in position of the speed-responsive device due to changes in load, part of the pilot-valves 39 will normally be closed, a part will normally be open, and at least one valve will be opening and closing for the purpose of regulating. From this it follows that there will be a corresponding relation of the main or nozzle valves. Under maximum load conditions all of the nozzle-valves will be open. When the load is entirely removed, all of the valves will be closed.

In Fig. 4 is shown in perspective the nozzle-valve 7. It is provided with a slot 48, opening from one side, that is adapted to receive the valve-stem 12. It is also provided with an enlargement 49, that receives the head on the lower end of the valve-stem. The head being larger in diameter than the slot 48, the valve is prevented from moving longitudinally thereon; but the valve can be removed from the stem by a lateral or sidewise movement. By reason of this construction it is a simple matter to substitute one valve for another.

Fig. 5 shows a construction wherein the piston-rod and stem 17 are formed in one piece and the upper end of the piston-rod, as indicated at 50, is so shaped that it acts as a valve to cut off the leakage from the cylinder-space to the conduit 22 when the valve is open. By making these parts in a single piece it is possible to open the valve in case it tends to stick by raising the rod 17.

With a slight modification the valves can be operated by air, water, oil, or other liquid under pressure. When operated with oil or water, it will be found convenient to use the same source of supply that feeds lubricant to the step or other bearings.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. In a governing mechanism, the combination of a plurality of nozzle-passages discharging fluid against buckets inclosed by the turbine-casing, valves for the nozzle-passages contained in a chest, a plurality of motors for opening and closing the valves in response to changes in position of the governor, the said motors being concealed from view, a governor responding to load changes, means exposed to view for closing the valves, and indicators for the valves to show whether they are open or closed.

2. In a governing mechanism, the combination of a plurality of nozzle-valves, a plurality of motors for operating them which are concealed from view, a speed-responsive device which normally holds part of the nozzle-valves closed, part of them open and causes at least one valve to frequently open and close, for governing purposes, the relation between the valves and governor being such that the latter actuates another valve in case one sticks, and indicators for the valves to show whether they are open or closed.

3. In a governing mechanism, the combination of a plurality of nozzle-valves, individual motors for operating the valves, relay-valves for controlling the motors, indicators attached to the nozzle-valves to show whether they are open or closed, and a speed-responsive device which actuates the relay-valves in a predetermined sequence.

4. In a governing mechanism, the combination of a plurality of nozzle-valves, a means for actuating the nozzle-valves individually, indicators for showing the position of the valves, a means for each valve located outside of the fluid-space, which tends at all times to close the valve, and also serves by reason of its position to indicate whether or not the valve is open or closed, and a speed-responsive device which normally opens and closes the valves in a predetermined order as the load conditions change.

5. In a governing mechanism, the combination of a plurality of nozzle-valves, a means concealed from view for normally actuating the valves in a predetermined sequence, devices which are exposed to view for closing the valve, a means actuated by each valve to indicate whether it is open or closed, and a speed-responsive device for controlling the action of the valves.

6. In a governing mechanism, the combination of a plurality of nozzle-passages, valves controlling the admission of fluid to the passages, which are arranged in staggered relation, and means responsive to load changes for actuating the valves in predetermined order, said means overlapping for the purpose of reducing the dimensions of the mechanism.

7. In a governing mechanism, the combination of a plurality of nozzle-passages, valves controlling the admission of fluid to the passages, which are arranged in staggered relation, passages or ports extending in opposite directions from the valves toward a common median plane and discharging into the nozzle-passages, and a speed-responsive device for actuating the valves.

8. In a governing mechanism, the combination of a plurality of nozzle-passages, valves controlling the admission of fluid to the passages, fluid-pressure motors for actuating the valves, the valves and motor being arranged in staggered relation on opposite sides of a median plane, passages extending from the valves toward said plane, and a speed-responsive device for controlling the action of the valves and motors.

9. In a governing mechanism, the combination of a device responsive to load conditions, a plurality of separately-actuated nozzle-valves, fluid-actuated motors for operating them, means located outside of the fluid-space tending to close the valves, a fluid-containing chest which is common to all of the valves, and relay-valves for controlling the nozzle-valves.

10. In a governing mechanism, the combination of a device responsive to load conditions, a plurality of separately-actuated nozzle-valves, each having an open and a closed position but no intermediate, fluid-actuated motors for operating them, means located outside of the fluid-space tending to close the valves, a fluid-containing chest which is common to all of the valves, relay-valves for controlling the nozzle-valves, and means for actuating the relay-valves.

11. In a governing mechanism, the combination of a device responsive to load conditions, a nozzle-valve, a fluid-actuated motor for operating it, a valve for cutting off the leakage when the nozzle-valve is in one of its positions, a fluid-containing chest in which the valve is located, a spring located outside of the influence of the motive fluid tending to close the valve, and a valve controlling the passage of fluid toward and away from the motor.

12. In combination, a chest, a valve-seat mounted therein, a main valve which coöperates with the seat to control the passage of fluid therethrough and also to prevent pounding, a fluid-actuated motor for moving the valve, and a valve actuated by the motor for preventing leakage when the main valve is in one of its positions.

13. In combination, a chest, a valve-seat mounted therein, a guide formed on the seat, a main valve which is detachably secured to its stem and is held in place thereon by the guide, a piston and cylinder for operating the valve, the said cylinder being in open communication with the chest when the valve is closed, and a valve which cuts off the cylinder-space from the chest when the main valve opens.

14. In combination, a chest, a main valve mounted therein, a piston and cylinder for operating the valve, a head for the cylinder, a rod passing through the head and acting on the piston, the rod and piston being separate structures, a movable abutment located in line with the rod and out of the fluid-space, and a yielding device which acts on the abutment.

15. In combination, a chest, a cylinder mounted thereon which has an extension that enters the chest and acts as a guide for the valve-stem, a seat in the chest which also acts as a guide for the valve, a valve, a stem therefor, and a piston located in the cylinder for actuating the valve.

16. In combination, a chest, a cylinder mounted thereon which has an extension that enters the chest, a valve-seat supported by the projection, a main valve and actuating-stem, a seat for the main valve, a leakage-preventing valve which moves with the stem and engages the seat supported by the projection, and a piston located in the cylinder for actuating the main valve.

17. In combination, a chest, a cylinder mounted thereon, a valve-seat supported by the chest, a valve which is recessed to receive an enlarged head on the valve-stem, a guide formed on the valve-seat which also acts as a dash-pot, a leakage-preventing valve which closes when the main valve opens and prevents access of fluid to the cylinder, and a piston which is located in the cylinder and is attached to both valves.

18. In combination, a chest, a cylinder mounted thereon, a piston located in the cylinder, a valve actuated by the piston, a seat for the valve, a rod situated in line with the piston parts and engaging therewith, a packing around the rod, and an adjustable yielding abutment which continually urges the valve in one direction.

19. In combination, a chest, a cylinder mounted thereon, a piston located in the cylinder, a valve situated in line with and actuated by the piston, a head for the cylinder which has an opening, a rod located in the opening and engaging the piston parts, an abutment which urges the rod in one direction, and retaining means which are common to the abutment, head and cylinder.

20. In combination, a chest, a cylinder, a piston therein, a valve operated by the piston, a rod extending through the cylinder-head, a yielding abutment located outside of the cylinder-space for urging the piston and valve in one direction, a relay-valve controlling the admission of fluid to the cylinder, and means for controlling the valve.

21. In combination, a chest containing a main chamber, a plurality of secondary chambers or passages leading therefrom, a number of valves located between the main and secondary chambers for controlling the passage of fluid between them, fluid-actuated motors for the valves comprising pistons and cylinders, and openings in the wall of the chest which receive the cylinders and are arranged in staggered relation.

22. In combination, a chest, a plurality of valves located therein for controlling the passage of fluid, each valve having a motor and comprising a cylinder and piston for operating it mounted on the chest, a stationary abutment, a spring engaging therewith for urging the valve in one direction, and pillars rising from the cylinder which support the abutment.

In witness whereof I have hereunto set my hand this 19th day of May, 1904.

OSCAR JUNGGREN.

Witnesses:
BENJAMIN B. HULL,
HELEN ORFORD.